United States Patent [19] — Shinbo et al.

Patent Number: 4,842,935
Date of Patent: Jun. 27, 1989

[54] FILLER FOR SEPARATING OPTICAL ISOMER

[75] Inventors: Toshio Shinbo; Koichiro Nishimura; Tomohiko Yamaguchi; Masaaki Sugiura, all of Ibaraki, Japan

[73] Assignee: Director-General Agency of Industrial Science and Technology, Tokyo, Japan

[21] Appl. No.: 22,039

[22] Filed: Mar. 5, 1987

[30] Foreign Application Priority Data

Mar. 7, 1986 [JP] Japan .................................. 61-51062

[51] Int. Cl.$^4$ ...................... B01D 15/08; C02F 1/28; B32B 9/00
[52] U.S. Cl. .................................. 428/404; 106/483; 106/466; 106/461; 210/198.2; 210/656; 428/403; 428/407; 435/803
[58] Field of Search ...................... 428/403, 404, 407; 106/308 F; 210/198.2, 656; 435/803; 261/DIG. 72

[56] References Cited

U.S. PATENT DOCUMENTS 4,474,963 10/1984 Gokel .................................. 546/178
4,640,943 2/1987 Meguro et al. ................. 106/308 F

OTHER PUBLICATIONS

Lynn R. Sousa et al., "Host-Quest Complexation. 12. Total Optical Resolution of Amine and Amino Ester Salts by Chromatograph[1,2]", Dept. of Chemistry of the University of California, 12/5/77.

G. Dotsevi Yao Sogah et al., "Host-Guest Complexation. 14. Host Covalently Bound to Polystyrene Resin for Chromatographic Resolution of Enantiomers of Amino Acid and Ester Salts[1,2]", Dept. of Chemistry of the Univ. of Cal., dated 8/30/78, Journal of the American Chemical Society, May 1979.

David S. Lingenfelter et al., "Host-Guest Complexation. 23. High Chiral Recognition of Amino Acid and Ester Guests by Hosts Containing One Chiral Element[1]", Dept. of Chemistry of the Univ. of Cal., dated 6/11/80, J. Org. Chem. 1981, 46. 393-406.

V. A. Davankov et al., "XV* Resolution of Alpha-Amino Acids on Reversed-Phase Silica Gels Coated with N-Decyl-$_L$-Histidine", Jnl. of Chromatograph, 218 (1981) 547-557.

Keiichi Kimura et al., Convenient, Efficient Crown Ether-Containing Stationary Phases for Chromatographic Separation of Alkali Metal Ions: "Dynamic Coating of Highly Lipophilic Crown Ethers on Oactadecylsilanized Silica", J. Chem. Soc., Chem. Commun., (1984), pp. 271-272.

G. Dotsevi et al., Journal of the American Chemical Society, vol. 97, No. 5, pp. 1259-1261, Mar. 5, 1975.

Primary Examiner—George F. Lesmes
Assistant Examiner—James B. Monroe
Attorney, Agent, or Firm—Birch, Stewart, Kolasch & Birch

[57] ABSTRACT

A filler for separating an optical isomer comprising a surface-hydrophobic filler component and an optically active lipophilic crown compound carried on the filler component by adsorption. The filler may be charged in a column to carry out separation of a sample such as amino acid or the like in the form of an aqueous solution.

8 Claims, No Drawings

FILLER FOR SEPARATING OPTICAL ISOMER

BACKGROUND OF THE INVENTION

1. Field of the Invention

This invention relates to a novel filler for separating an optical isomer, and more specifically it relates to a filler which is capable of separating optical isomers from one another by a column process.

2. Description of the Prior Art

For separating an optical isomer such as amino acid or the like, various methods are known in the art including a diastereomer forming process, a crystal inoculation process, an enzyme process, an isolation film process and a column process. Of such conventional methods, the column process is capable of carrying out optical resolution of optical isomers completely. The column process has another advantage that continuous operation is possible when it is combined with Sarex techniques. However, most of the optical resolution column processes which have been proposed for amino acid separation utilize a ligand exchange process as their resolution principle. Accordingly, it is required to use an eluent containing a metal ion such as a copper ion or the like, or to use an eluent containing another optically active amino acid, if circumstances require. Thus these processes are unsuitable for resolution of an optical isomer.

On the other hand as the column process which does not utilize a ligand exchange principle there has been solely a process using a column filler obtained by chemical bonding (covalent bonding) polystyrene or silica gel with an optically active crown compound (J.Am.Chem.Soc.,97, 1259(1975) and ibid.,101, 3035(1979)). However, this process has disadvantages that not only the number of theoretical plates is small but the preparation of the filler is troublesome and requires high cost. Also, it has another disadvantage in that an organic solvent must be used as an eluent, so that it may not be applied to an aqueous solution of sample to be separated.

SUMMARY OF THE INVENTION

The present invention has been made in view of the foregoing disadvantages of the prior arts.

Accordingly, it is an object of the present invention to provide a column filler which is useful for separating an optical isomer and is capable of being manufactured with ease and at a low cost.

It is another object of the present invention to provide a column filler which is suitable for separating an optical isomer by using pure water or volatile dilute acid as an eluent after an adsorption treatment, for example, so that an aqueous solution of amino acid may be used for separation.

Other and further objects, features and advantages of the invention will appear more fully from the following description.

DETAILED DESCRIPTION OF THE INVENTION

In accordance with the present invention, there is provided a column filler for separating an optical isomer which is featured in that an optically active lipophilic crown compound (crown ether) is carried on a surface-hydrophobic filler component by adsorption.

The optically active crown compound which can be used in the present invention includes substantially all kinds of crown compounds having an optically active group. A crown compound which is particularly preferably used in the present invention may be represented by the following general formula (I):

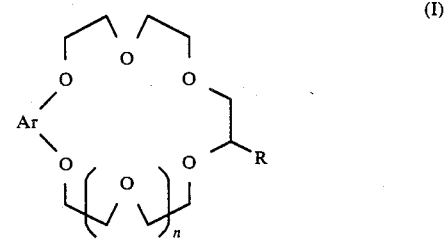

wherein, Ar denotes an optically active divalent aromatic group, which may be represented by, for example, the following general formula (II):

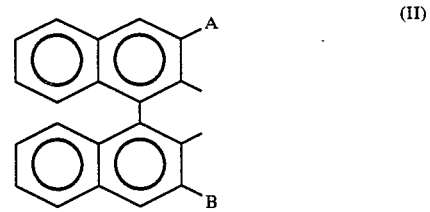

wherein A and B each denotes a hydrogen atom, an alkyl group (preferably having carbon atoms of 1 to 3) such as a methyl group, or an aryl group such as a phenyl group.

Also, in the general formula (I), R denotes a hydrogen atom or an alkyl group, particularly, a long chain alkyl group having carbon atoms of about 6 to 16, and n is an integer of 1 or 2.

The crown compound represented by the general formula (I) may be prepared by, for example, reacting an optically active aromatic derivative represented by the following general formula (III):

(wherein, Ar has the same meaning as described above and M is alkaline metal) with an alkyl derivative of 1, ω-substituted penta- or hexa-ethylene glycol represented by the following general formula (IV):

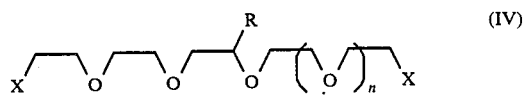

(wherein, X denotes chlorine, iodine or a tosyloxy group, and R and n each has the same meaning as described above) in equimolar amounts in an organic solvent such as tetrahydrofuran, dioxan, N,N'-dimethylformamide or the like under an inert gas atmosphere.

The optically active crown compound which may be used in the present invention may be either an R-form optical isomer or an S-form one. When, for example, the R-form optical isomer is used, a column filler can be obtained by which a D-form isomer is eluted therefrom after the elution of a L-form isomer; whereas, when the S-form isomer is used, a column filler can be obtained by which the L-form isomer is eluted therefrom after the D-form one.

In the present invention, the filler component on which the optically active crown compound is adsorptively carried is a surface-hydrophobic one (reversed phase adsorbent). Such a surface-hydrophobic filler component may be prepared by modifying the surface of a filler material with a hydrophobic compound according to any suitable conventional method. In this case, the filler material may be selected from the group consisting of silica, alumina, magnesia, silica-alumina and the like. The hydrophobic compound may be selected from the group consisting of a compound having any one of hydrocarbon chains including a lower or higher alkyl group, which is preferably an alkyl group having carbon atoms $8 \sim 8$, such as octyl, dodecyl and octadecyl, (although a lower alkyl group having carbon atoms $1 \sim 5$, such as methyl, propyl and butyl group and a alkyl group having carbon atoms over 18 may be used) an aryl group such as phenyl, an alkylphenyl group or the like, and a compound having a haloalkyl group containing fluorine, chlorine or the like. Modification of the surface of filler material with the hydrophobic compound may be carried out according to any suitable conventional process such as physical adsorption, chemical bonding or -the like, although it is not limited to such a process. Also, in the present invention, any commercially available inorganic or organic surface-hydrophobic filler material may be used as the surface-hydrophobic filler component without any modification.

The optical isomer separating filler according to the present invention is prepared by carrying the optically active lipophilic crown compound on the surface-hydrophobic filler component by physical adsorption. The amount of the crown compound adsorptively carried on the surface-hydrophobic filler component is not limited to any specific range. However, in order to accomplish satisfactory separation, it is preferably $10^{-5}$ mol or more per 1 ml of the surface-hydrophobic filler component. The upper amount is not limited. However, it is preferably up to $10^{-3}$ mol per 1 ml of the surface-hydrophobic filler component.

The adsorptive carrying of the crown compound on the filler component is preferably practiced according to the following procedures. More particularly, the surface-hydrophobic filler component is charged in a column and then a solution of an optically active fat-soluble crown compound in a mixed solvent consisting of organic solvent and water of a fixed composition is circulated through the column by means of a pump. In this process, as the adsorptive carrying of the crown compound on the surface-hydrophobic filler component proceeds, the concentration of the crown compound in the circulated solution decreases. Accordingly, it is required to add additional water to the solution in a predetermined time to decrease solubility of the crown compound in the circulated solution and to recirculate it through the column. Such procedures are repeated to obtain the filler of the present invention which comprises the surface-hydrophobic filler component and the crown compound adsorbed thereon. The organic solvent described above may be selected from the group consisting of alcohol such as methanol, ethanol, propanol or the like, acetonitrile, tetrahydrofuran, and the like.

A column charged with the filler of the present invention may be used for separation of various optical isomers. For example, it is conveniently used for optical resolution of an amino compound such as amino acid, amine or the like. It is more conveniently used for optical resolution of a compound in which an amino group is bonded to an asymmetric carbon, particularly, for optical resolution of a racemic phenylglycine, methionine, leucine, glutamic acid, phenylalanine, cysteine, tyrosine, alanine, phenylethyl amine or the like. Also, a column charged with the filler of the present invention is applied to separation of an optically active organic ion by utilizing the mutual action of the ions.

As an eluent for the column charged with the filler of the present invention are used pure water and a dilute aqueous solution of salt or acid. The dilute acid solution is preferably used because of exhibiting an increased separating effect.

EXAMPLES

The following examples are exemplary of the present invention.

EXAMPLE 1

A: Column for Separation of Optical Isomer

An optically active R-form crown compound represented by the above-described general formula (I) wherein Ar is 3,3'-diphenyl-1,1'-binaphthyl-2,2'-diyl, R is H and n is 1 was dissolved in amounts of 58 mg in about 80% aqueous methanol solution, and then the solution was circulated for 24 hours through a column (ODS column) (diameter: 4mm, length: 125mm) charged with a surface-hydrophobic filler component comprising a commercially available octadecylsilica (ODS) (particle diameter: 5 μm) by means of a pump. During this circulation, water was added in order to gradually decrease the content of methanol in the circulated solution, resulting in the circulated solution finally containing about 40% methanol. This caused the crown compound to be substantially completely adsorbed on the ODS charged in the column. The amount of the crown compound on the ODS was $5.8 \times 10^{-5}$ mol/ml of ODS.

B: Separation of Optical Isomer

A high-performance liquid chromatography apparatus equipped with a DIP-1 type pump manufactured by Nippon Bunko Co., an S-3101A type UV detector manufactured by Sohma Kohgaku Co. and a Rheodyne sample injector was connected to the optical isomer separating column prepared by the above described procedure and carried out separation of various racemic amino acids and amines. The results are shown in Table 1.

In the separation process, $10^{-2}M$ $HClO_4$ used as an eluent and the process was carried out at temperatures of 18° C. and 2° C. The amount of each sample was $10^{-8}$ mol. Detection of the amino compound was done by measuring UV adsorption of 200 nm or 254 nm.

TABLE 1

(Optical resolution of racemic body)

| | 18° C. | | | 2° C. | | |
|---|---|---|---|---|---|---|
| | Capacity factor | | Separation | Capacity factor | | Separation |
| Amino Compound | L-form | D-form | ratio α | L-form | D-form | ratio α |
| Alanine | 0.24 | 0.48 | 2.02 | 0.37 | 0.16 | 2.72 |
| Valine | 0.89 | 1.01 | 1.14 | 1.06 | 1.31 | 1.24 |
| Leucine | 3.11 | 5.14 | 1.65 | 3.82 | 8.37 | 2.19 |
| Isoleucine | 2.59 | 2.87 | 1.11 | 2.82 | 3.70 | 1.31 |
| Allo-isoleucine | 2.35 | 2.60 | 1.10 | 2.75 | 3.20 | 1.16 |
| Phenylglycine | 2.00 | 9.17 | 4.58 | 2.83 | 25.71 | 9.07 |
| Phenylalanine | 9.25 | 11.50 | 1.24 | 14.27 | 19.87 | 1.39 |
| Methionine | 1.77 | 3.65 | 2.06 | 2.73 | 8.27 | 3.03 |
| Cysteine | 0.24 | 0.43 | 1.81 | 0.34 | 0.89 | 2.60 |
| Tyrosine | 7.11 | 8.61 | 1.21 | 15.88 | 20.77 | 1.31 |
| Aspartic acid | 0.14 | 0.28 | 2.07 | 0.32 | 0.70 | 2.18 |
| Glutamic acid | 0.32 | 1.18 | 3.73 | 0.58 | 3.54 | 6.08 |
| Lysine | 0.51 | 0.63 | 1.22 | 1.38 | 1.85 | 1.35 |
| Arginine | 0.36 | 0.62 | 1.75 | 0.67 | 1.88 | 2.82 |
| Threonine | 0.16 | 0.24 | 1.50 | 0.21 | 0.47 | 2.24 |
| Phenylethylamine | 10.36 | 6.50 | 0.63 | 25.05 | 18.05 | 0.72 |

As can be seen from Table 1, the L-form was eluted in advance of the D-form in each case of the amino acids, whereas the D-form was eluted in advance of the F-form in the case of phenylethylamine. The separation ratio was increased or improved by lowering the column temperature. At the column temperature of 2° C., 14 amino acids, i,e., alanine, leucine, isoleucine, allo-isoleucine, glutamic acid, phenylalanine, methionine, threonine, valine, tyrosine, cysteine, lysine, arginine and phenylglycine were completely separated into respective enantiomers. In particular, the separation ratio of phenylglycine was reached to a level as high as 9.

Commercially available DL-isoleucine is generally a mixture of four stereoisomers, i.e., D-, L-, D-allo- and L-allo-forms. It was found that these isomers can be separated from one another by the column using the column filler of the present invention. That is, the four form isomers were separated into three peaks of L-form+L-allo-form, D-allo-form and D-form peaks. The column filler used in this case was that having an R-form crown compound absorbed therein. However, by using a column filler having an S-form crown compound adsorbed therein as used in Example 2 described hereinafter, the L-form+L-allo-form mixed isomer was separated into two isomer components completely.

The separating effects of different eluents are shown in Table 2. Methionine of $10^{-7}$ mol was used as a sample to be separated and the column temperature was set at 18° C. When using aqueous solution of perchloric acid (HClO$_4$) as eluent, retention time of methionine was gradually shortened as the concentration of the eluent decreased, so that methionine was eluted earlier. In regard to other dilute acid solutions, like phenomena occur when a more hydrophilic acid is used. However, the separation ratio was substantially unvaried throughout the experiments. In particular, the fact that the optical resolution was possible even when pure water was used as an eluent proves that the resolution can be highly and conveniently carried out.

TABLE 2

(Effect of eluent on optical resolution of methionine)

| Column parameter | Capacity factor | | Separation |
|---|---|---|---|
| Eluent | L-form | D-form | ratio α |
| Water | 0.74 | 1.28 | 1.73 |
| $3 \times 10^{-5}$ M HClO$_4$ | 0.98 | 1.76 | 1.80 |
| $10^{-4}$ M HClO$_4$ | 0.99 | 1.81 | 1.83 |
| $3 \times 10^{-4}$ M HClO$_4$ | 1.05 | 1.91 | 1.83 |

TABLE 2-continued (Effect of eluent on optical resolution of methionine)

| Column parameter | Capacity factor | | Separation |
|---|---|---|---|
| Eluent | L-form | D-form | ratio α |
| $10^{-3}$ M HClO$_4$ | 1.10 | 2.08 | 1.89 |
| $3 \times 10^{-2}$ M HClO$_4$ | 1.28 | 2.51 | 1.96 |
| $10^{-2}$ M HClO$_4$ | 1.75 | 3.62 | 2.07 |
| $10^{-2}$ M HNO$_3$ | 1.23 | 2.41 | 1.96 |
| $10^{-2}$ M HCl | 1.16 | 2.28 | 1.96 |
| $10^{-2}$ N H$_2$SO$_4$ | 1.02 | 2.00 | 1.96 |

EXAMPLE 2

Example 1 was substantially repeated to obtain an ODS column except that 39 mg of an optically active S-form crown compound of the above-described general formula (I) where Ar is 3,3'-diphenyl-1,1'-binaphtyl-2,2'-diyl, R is H and n is 1 was used. The amount of the crown compound carried on a surface-hydrophobic filler component was $3.9 \times 10^{-5}$ mol/ml. Amino acids were subjected to an optical resolution treatment using this modified ODS column. The results are shown in Table 3. The column temperature was 2° C., $10^{-2}$M HClO$_4$ was used as an eluent, and each of the samples was used in an amount of $10^{-8}$ mol.

In this Example 2, D-form amino acid was eluted in advance to L-form amino acid, as different from in Example 1.

The separation ratio (α) of each sample was decreased as compared to in Example 1, because of decreasing the amount of the crown compound adsorbed on ODS.

TABLE 3

(Optical resolution of amino acid when S-type crown compound is used)

| Column parameter | Capacity factor | | Separation |
|---|---|---|---|
| Amino acid | D-form | L-form | ratio α |
| Alanine | 0.25 | 0.44 | 1.77 |
| Leucine | 4.04 | 5.94 | 1.47 |
| Phenylglycine | 2.33 | 8.81 | 3.78 |
| Phenylalanine | 12.41 | 14.60 | 1.18 |
| Methionine | 2.12 | 3.82 | 1.80 |
| Tyrocine | 9.73 | 11.16 | 1.15 |
| Glutamic acid | 0.34 | 1.03 | 3.03 |

EXAMPLE 3

An optically active R-form crown compound of the above-described general formula (I) wherein Ar is 3,3'-diphenyl-1,1'-binaphtyl-2,2'-diyl, R is $C_{14}H_{29}$, and n is 1 was dissolved in amounts of 58 mg in about 90% methanol solution in water to obtain its solution, as similar to Example 1. A ratio of water in the solution was gradually increased to cause the methanol content to be finally about 70%, so that the crown compound was adsorbed in an ODS column (diameter; 4 mm, length: 125 mm). The amount of the crown compound adsorbed was $4.4 \times 10^{-5}$ mol/ml. Results of the separation the various racemic amino acids to each optical isomer which was carried out using this column are shown in Table 4. A column temperature was 2° C., $10^{-2}$M $HClO_4$ was used as an eluent, and the amount of each sample was $10^{-7}$ mol. In this Example, the L-form amino acid was eluted in advance of the D-form amino acid, as same as in the above-described Example 1, and the separation of the D-form amino acid from the L-form amino acid was carried out. Also, satisfactory determination analysis of the amino acid was carried out. A peak area in the chromatogram was linearly increased with an increase in amino acid concentration, and an error in the measurement was within 1%. Table 5 shows temperature dependency of a DL separation ratio ($\alpha$) obtained using phenylglycine. The separation ratio ($\alpha$) was increased with lowering of the column temperature, as same as in Example 1.

| (DL separation ratio of amino acid) | | | |
| --- | --- | --- | --- |
| Column parameter | Capacity factor | | Separation |
| Amino acid | L-form | D-form | ratio $\alpha$ |
| Alanine | 0.21 | 0.35 | 1.70 |
| Valine | 1.13 | 1.20 | 1.07 |
| Leucine | 3.11 | 5.19 | 1.67 |
| Methionine | 1.94 | 3.78 | 1.95 |
| Isoleucine | 3.07 | 3.57 | 1.16 |
| Phenylalanine | 13.17 | 15.67 | 1.19 |
| Phenylglycine | 2.00 | 7.73 | 3.87 |

TABLE 5

| (Temperature dependency of DL separation ratio of phenylglycine) | | | |
| --- | --- | --- | --- |
| Column parameter | Capacity factor | | Separation |
| Temperature (°C.) | L-form | D-form | ratio $\alpha$ |
| 2 | 2.00 | 7.73 | 3.87 |
| 6 | 1.77 | 5.97 | 3.37 |
| 10 | 1.75 | 4.94 | 2.81 |
| 14 | 1.57 | 3.92 | 2.49 |
| 18 | 1.51 | 3.37 | 2.23 |
| 22 | 1.42 | 2.83 | 2.00 |
| 26 | 1.34 | 2.45 | 1.82 |
| 30 | 1.27 | 2.16 | 1.69 |
| 34 | 1.21 | 1.91 | 1.59 |

As can be seen from the foregoing Examples, the filler of the present invention is manufactured with ease and at a low cost and is highly suitable for separation of an optical isomer. A column charged with the filler of the present invention allows the use of pure water and dilute acid as an eluent, so that an amino acid solution to be subjected to separation may be prepared in the form of an aqueous solution. Also, the filler of the present invention can be used not only in a small-sized column for chemical analysis but in a large-sized one for industrial processing.

Obviously many modifications and variations of the present invention are possible in the light of the above teachings. It is therefore to be understood that within the scope of the appended claims the invention may be practiced otherwise than as specifically described.

What is claimed is:

1. A column filler for separating an optical isomer comprising a surface-hydrophobic filler component and an optically active lipophilic crown compound adsorbed on said surface-hydrophobic filler component;
   said lipophilic crown compound represented by the formula:

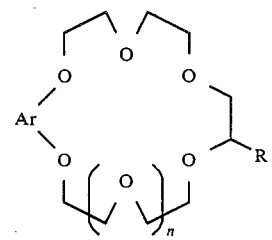

wherein Ar is an optically active divalent aromatic group; R is a hydrogen or an alkyl group, and n is an integer of 1 or 2.

2. The column filler according to claim 1, wherein said surface-hydrophobic filler component comprises a filler material selected from the group consisting of silica, alumina, magnesia, silica-alumina and mixtures thereof.

3. The column filler for separating an optical isomer as defined in claim 1, wherein said Ar is an optically active divalent aromatic group represented by the following formula:

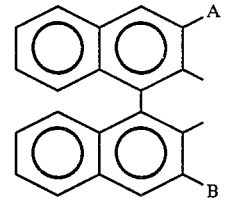

wherein A and B, each, is a hydrogen atom, an alkyl group or an aryl group.

4. The column filler for separating an optical isomer as defined in claim 3, wherein said A and B are each phenyl.

5. The column filler for separating an optical isomer as defined in claim 1, wherein said surface-hydrophobic filler component comprises a filler material the surface of which is modified with a hydrophobic compound.

6. The column filler for separating an optical isomer as defined in claim 1, wherein the amount of said optically active crown compound adsorbed on said surface-hydrophobic filler component is $10^{-5}$ mol or more per 1 ml of said filler component.

7. The column filler as defined in claim 6 wherein the amount of said optically active crown compound adsorbed on said surface-hydrophobic filler component is $10^{-5}$ mol to $10^{-3}$ mol per 1 ml of said filler component.

8. The column filler according to claim 7 wherein said surface-hydrophobic filler component the surface of which is modified with a hydrophobic compound selected from the group consisting of an alkyl group, an aryl group and a haloalkyl group.

* * * * *